(No Model.) 2 Sheets—Sheet 1.
J. J. WOOD.
SELF LUBRICATING JOURNAL BEARING.
No. 493,742. Patented Mar. 21, 1893.
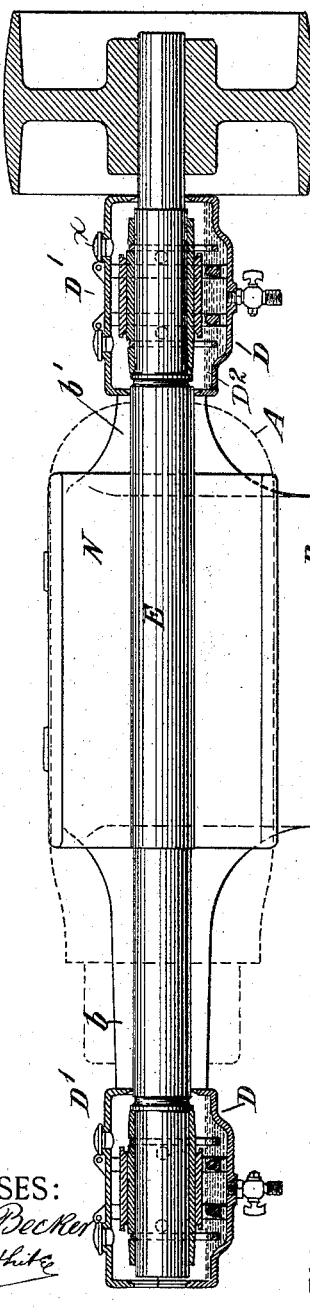
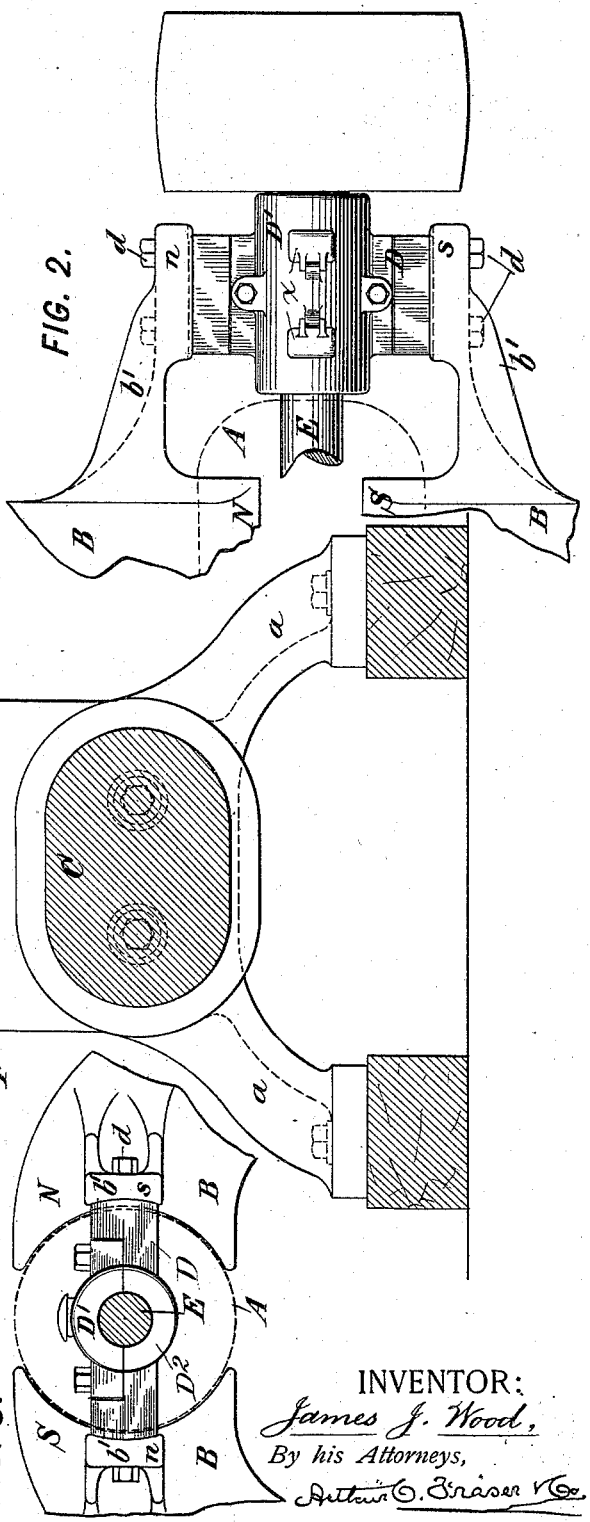
WITNESSES:
John Becker
Fred White
INVENTOR:
James J. Wood,
By his Attorneys,
Arthur C. Fraser & Co.

(No Model.) 2 Sheets—Sheet 2.

J. J. WOOD.
SELF LUBRICATING JOURNAL BEARING.

No. 493,742. Patented Mar. 21, 1893.

WITNESSES:
John Becker
Fred White

INVENTOR:
James J. Wood,
By his Attorneys,
Arthur E. Fraser & Co.

UNITED STATES PATENT OFFICE.

JAMES J. WOOD, OF FORT WAYNE, INDIANA.

SELF-LUBRICATING JOURNAL-BEARING.

SPECIFICATION forming part of Letters Patent No. 493,742, dated March 21, 1893.

Application filed May 2, 1892. Serial No. 431,554. (No model.)

*To all whom it may concern:*

Be it known that I, JAMES J. WOOD, a citizen of the United States, residing at Fort Wayne, in the county of Allen and State of Indiana, have invented certain new and useful Improvements in Self-Oiling Journal-Bearings, of which the following is a specification.

This invention provides an improved construction of shaft bearing designed particularly for machinery shafts turning at high speed. It is particularly adapted for the shafts of dynamo electric machines, and is shown in the accompanying drawings as applied to that purpose.

My improved journal bearing is a self-oiling expansible bearing. So long as it is kept supplied with oil it acts to keep the journal thoroughly lubricated, and in case through negligence it should run dry and should consequently heat, the inner bearing bushing is so mounted as to be freely expanded by the heat so that the shaft cannot be bound fast.

My present invention constitutes an improvement upon the expansion-bearing disclosed in my patent No. 421,089, dated February 11, 1890, its object being to provide in connection therewith means for rendering the bearing self-oiling.

Figure 5:
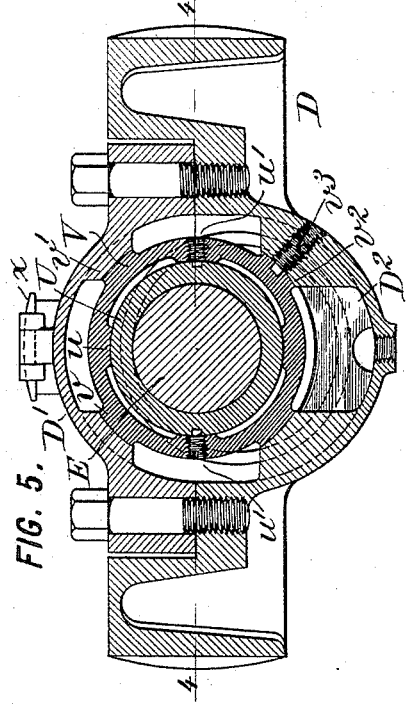
Figure 6:
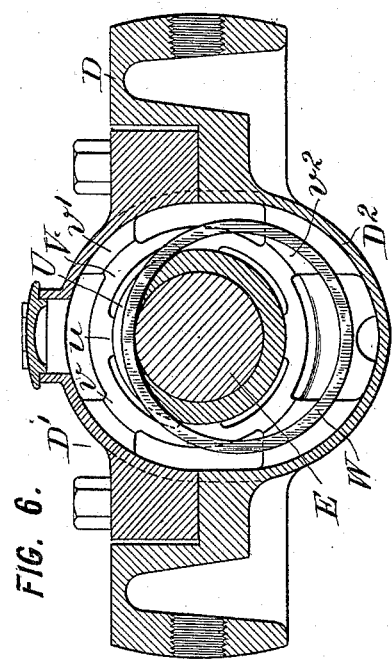
Figure 8:
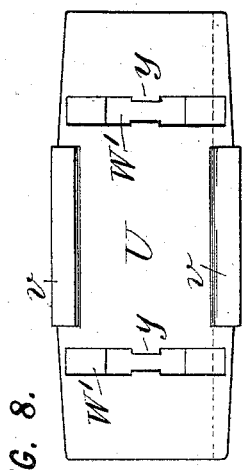
Figure 4:
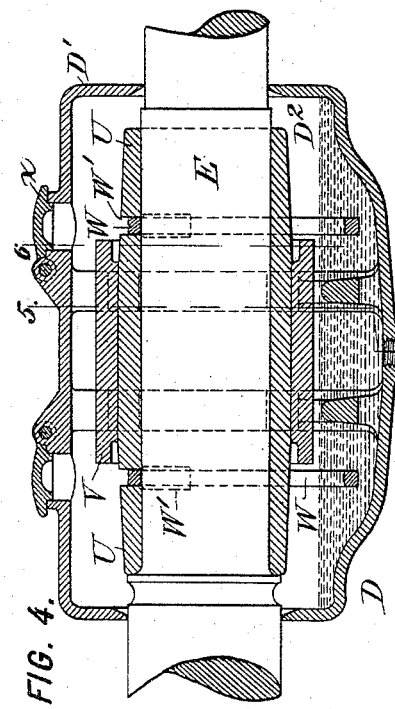
Figure 7:
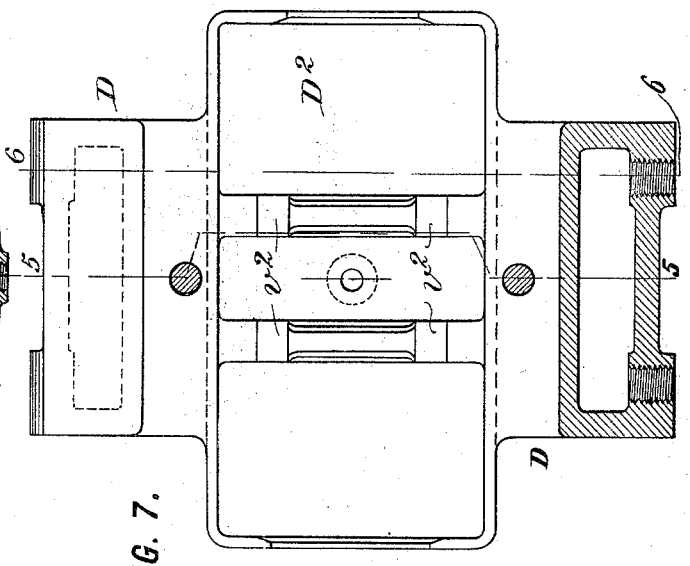

Figure 1 is a vertical transverse section of a dynamo electric machine, the armature shaft of which is provided with bearings constructed according to my invention. Fig 2 is a fragmentary plan showing one of the shaft bearings and its supporting brackets. Fig. 3 is a fragmentary end view, the shaft being in section just inside the pulley. Fig. 4 is a vertical longitudinal mid-section of one of the bearings. Fig. 5 is a transverse section thereof on the line 5—5 in Figs. 4 and 7. Fig. 6 is a similar transverse section in the plane of the line 6—6 in Figs. 4 and 7. Fig. 7 is a plan of the bearing cross-head, one side thereof being in horizontal mid-section. Fig. 8 is a plan of the inner bushing of the bearing.

In Figs. 1, 2 and 3, the armature A is shown in dotted lines and the field-magnet F in full lines. The latter constitutes the fixed frame of the machine, being constructed of two solid frames or castings B B having each wide spreading legs $a\ a$ and an inwardly curving upper end, these upper ends of the two castings approaching each other and being bored out to form the polar ends N S of the field-magnet, as shown in Fig. 3. The castings are formed at their upper portions with arms $b\ b'$ extending from the opposite sides in directions parallel with the armature shaft E, and between the ends of the opposite pairs of arms are fastened cross-heads or bearing heads D D, which constitute the supports for the bearings for the armature shaft. As the respective bearing arms $b\ b$ and $b'\ b'$ are of opposite polarity (as designated with reference to the arms $b'$ by the letters $n\ s$ in Figs. 2 and 3) the bearing heads D D are made of non-magnetic material in order not to short-circuit the lines of magnetic force. I make them preferably of bronze. The bearing caps D' D', which are made considerably shorter, may be made of iron, provided they do not so closely approach the bearing arms as to short-circuit the magnetic lines of force.

The polar faces of the field-magnet between which the armature revolves are bored out cylindrically and concentrically with the axis of rotation, or substantially so, in the manner usual in dynamos. The end portions of the bearing arms $b\ b'$ are also bored out concentrically from the same axial center, although preferably of a larger radius than the polar faces, as shown in Fig. 3. The faces of the end portions are thus concaved, and the ends of the bearing head D are turned off cylindrically as shown in Figs. 3, 5 and 6, in order to fit the cylindrically concaved end portions of the bearing arms, and they are fastened to the latter by bolts $d\ d$ passing through the ends of the arms and screwing into the ends of the bearing head D.

The construction thus far described is that adopted in a machine to which my present invention has been applied, and is the preferable construction, but is not strictly essential to my present invention.

In dynamo electric machines and other large and heavy machinery having shafts revolving at high speeds, it is necessary to provide means for the automatic lubrication of the bearings in order to avoid serious injury and loss in case of the negligence of the workmen employed to look after the machinery. My improved construction of bearing is designed especially to meet this requirement.

Each of the journals of the shaft E turns directly in a sleeve U of bronze or other suitable bearing metal, which is supported within an expansible bushing V. This bushing in turn is supported within the outer bearing or box which in the construction shown consists of a bearing shell $D^2$ formed integrally with, and as the intermediate portion of, the bearing cross-head D, and covered over by a bearing cap D', so that the shell and cap together form a hollow box or shell of approximately cylindrical form, and of a length preferably somewhat greater than the width of the end portions of the bearing head D. The expansion bushing V may be of iron, and is formed on its exterior with four (more or less) bearing projections or lands $v\ v$, which are seated against projections $v'$ on the inner side of the bearing cap, and $v^2$ on the inner side of the shell $D^2$. Between these external supports the expansion bushing is provided with internal supporting projections or lands $u\ u$, which closely embrace and support the sleeve U. In case the shaft should run dry and generate heat to expand the sleeve U, the latter would be free to expand outwardly and thereby relieve frictional contact with the shaft by the yielding of the expansion bushing V, which will be distorted or pressed outwardly at the four bearing shoulders $u\ u$, whereby the binding of the journal in the sleeve U would be prevented, and damage which would result therefrom would be avoided. To prevent rotation of the bearing, the bushing V is fastened to one of the projections $v^2$ by a set-screw $v^3$, and the sleeve U is fastened to the bushing V by set-screws $u'$, as shown in Fig. 5.

The lower bearing shell $D^2$ is turned up at its ends nearly into contact with the shaft as shown in Fig. 4, whereby it constitutes a cup for holding oil as shown. The oil may be introduced through hinged covers $x\ x$, or by applying an oil-cup. In order to render the shaft self-oiling, I apply oiling rings W W which are hung over the shaft journal, in slots W' W' formed in the upper part of the sleeve U as shown in Figs. 6 and 8. By the rotation of the shaft, these rings are caused to travel around as shown by the arrows in Fig. 6, so that they pass down through the oil, and ascending carry the oil up and apply it to the journal. This use of oiling rings is in itself an old expedient for self-oiling, and is claimed by me only as a part of the novel combination of oiling ring, inner sleeve, expansion bushing, and outer bearing shell. The expansion bushing V is made considerably shorter than the sleeve U, and the rings W W are arranged just beyond the ends of the expansion bushing as shown in Fig. 4. The slots W' W' are made wider than the rings, except at the middle, where they close toward each other by projections $y\ y$ as shown in Fig. 8, which form a free fit with the sides of the ring, whereby the ring is guided only at this point and is relieved from the friction of rubbing against the remaining surfaces of the slots. By their close fit with the ring, these projections serve to wipe off from it the oil which it carries on its sides, thereby applying this oil to the journal. The oil which works out of the sleeve U, which is shorter than the shell $D'\ D^2$, is thrown off centrifugally from the revolving journal and caught in the shell, flowing to the bottom thereof, where it is again taken up by the rings W W, and thereby a circulation is maintained.

I claim as my invention the following-defined novel features, substantially as hereinbefore specified, namely:

1. A shaft bearing consisting of the combination with a supporting shell or chamber adapted to contain oil, of an expansion bushing V seated therein, a bearing sleeve U held within said bushing and projecting beyond the ends thereof, and formed with slots W' W' beyond said bushing and oiling rings W W mounted on the journal in said slots.

2. A shaft bearing consisting of the combination of a transverse bearing head D supported at its ends and constructed at its middle portion with an oil-containing bearing shell $D^2$, and a cap D' covering said shell, with an expansion bushing V seated within said shell and cap, a bearing sleeve U held within said bushing and projecting beyond the ends thereof, with slots W' W' in its projecting portions, and oiling rings W W in said slots for supplying oil contained in said shell to the journal.

3. A shaft bearing consisting of the combination of a bearing shell $D^2$ and cap D', an expansion bushing V seated therein, a bearing sleeve U held by said bushing, projecting beyond the ends thereof, formed with slots W' W' beyond said bushing, contracted at the middle by opposite projections $y\ y$, and oiling rings W W mounted on the journal in said slots, whereby said rings turn between and are guided by said projections, and the latter serve to wipe the oil from the rings and apply it to the journal.

In witness whereof I have hereunto signed my name in the presence of two subscribing witnesses.

JAMES J. WOOD.

Witnesses:
CHAS. C. MILLER,
ROBERT F. HARDING.